US011113595B2

(12) United States Patent
Palumberi et al.

(10) Patent No.: US 11,113,595 B2
(45) Date of Patent: Sep. 7, 2021

(54) ON-DEMAND INTELLIGENT ASSISTANT

(71) Applicant: THE TRAVELERS INDEMNITY COMPANY, Hartford, CT (US)

(72) Inventors: Eric Palumberi, Rocky Hill, CT (US); David M. Fields, East Hampton, CT (US); Erik A. Harrold, Tolland, CT (US)

(73) Assignee: THE TRAVELERS INDEMNIFY COMPANY, Hartford, CT (US)

( * ) Notice: Subject to any disclaimer, the term of this patent is extended or adjusted under 35 U.S.C. 154(b) by 726 days.

(21) Appl. No.: 15/984,682

(22) Filed: May 21, 2018

(65) Prior Publication Data

US 2019/0354830 A1    Nov. 21, 2019

(51) Int. Cl.
| | | |
|---|---|---|
| *G06N 3/00* | (2006.01) | |
| *G06K 9/00* | (2006.01) | |
| *G10L 15/08* | (2006.01) | |
| *G06F 16/9535* | (2019.01) | |
| *G06F 40/40* | (2020.01) | |
| *G06F 40/35* | (2020.01) | |
| *G06F 16/9032* | (2019.01) | |
| *G06F 17/00* | (2019.01) | |

(52) U.S. Cl.
CPC ......... *G06N 3/006* (2013.01); *G06F 16/9535* (2019.01); *G06F 40/40* (2020.01); *G06K 9/00288* (2013.01); *G10L 15/08* (2013.01); *G06F 16/90332* (2019.01); *G06F 40/35* (2020.01); *G10L 2015/088* (2013.01)

(58) Field of Classification Search
CPC ..... G06N 3/006; G06F 40/40; G06F 16/9535; G06F 16/90332; G06F 40/35; G06K 9/00288; G10L 15/08; G10L 2015/088
See application file for complete search history.

(56) References Cited

U.S. PATENT DOCUMENTS

| | | | |
|---|---|---|---|
| 2015/0121216 A1* | 4/2015 | Brown | G06N 3/008 715/707 |
| 2017/0160813 A1* | 6/2017 | Divakaran | G06K 9/00221 |
| 2018/0322380 A1* | 11/2018 | Aggarwal | G06N 3/006 |
| 2021/0082436 A1* | 3/2021 | Ni | G10L 15/22 |

* cited by examiner

*Primary Examiner* — Quoc A Tran
(74) *Attorney, Agent, or Firm* — MH2 Technology Law Group, LLP (57) ABSTRACT

The present disclosure is directed to an on-demand intelligent assistant that obtains physical identifiers of a target individual using information received from sensors. The assistant determines an identity of the target individual using the physical identifiers. The assistant also caches the physical identifiers and the identity as baseline information of the target individual. The assistant further detects keywords used in communications of a user with the target individual. Moreover, the assistant determines that the user desires additional information of the target individual based on the keywords. Additionally, the assistant determines a query for the additional information using the baseline information and the keywords. Further, the assistant retrieves the additional information from a remote database using the query and provides the additional information to the user.

20 Claims, 6 Drawing Sheets

| BASELINE INFORMATION 503 | |
|---|---|
| TARGET NAME | JANE DOE |
| TARGET ID NUMBER | 4253425 |
| FIRST ACCOUNT TYPE | AUTOMOBILE |
| FIRST ACCOUNT NO. | 10-454523-34 |
| SECOND ACCOUNT TYPE | PERSONAL PROPERTY |
| SECCOND ACCOUNT NO. | 11-345362-54 |
| THIRD ACCOUNT TYPE | HOME |
| THIRD ACCOUNT NO. | 12-564618-01 |

ON-DEMAND INTELLIGENT ASSISTANT

BACKGROUND

Intelligent assistants are computer programs that perform tasks for individuals. Some intelligent assistants may use natural language processing (NLP) and artificial intelligence (AI) to continuously monitor an individual's spoken or written communications and autonomously interact. For example, an intelligent assistant may be a so-called "chatbot" that detects particular words or phrases in a conversation and automatically performs tasks, such as providing information (e.g., weather and news), performing a task (e.g., control smart appliances), and obtaining a service (e.g., purchase items from an online marketplace).

SUMMARY

The present disclosure is directed to an on-demand intelligent assistant that monitors communications of a user in regards to a target individual, and that selectively prefetches relevant information about the target individual. Implementations consistent with the present disclosure provide systems and methods for an on-demand intelligent assistant that can obtain physical identifiers of a target individual using information received from sensors. The systems and methods can also determine an identity of the target individual using the physical identifiers. The systems and methods can further cache the physical identifiers and the identity as baseline information of the target individual. Additionally, the systems and methods can detect keywords used in communications of a user with the target individual. Moreover, the systems and methods can determine that the user desires additional information of the target individual based on the keywords. Further, the systems and methods can determine a query for the additional information using the baseline information and the keywords. The systems and methods can also retrieve the additional information from a remote database using the query. The systems and methods can further provide the additional information to the user.

DRAWINGS

The present invention will become more fully understood from the detailed description and the accompanying drawings, wherein.

DETAILED DESCRIPTION

The present disclosure is generally directed to systems and processes providing automated assistants. More particularly, the present disclosure is directed to systems and processes providing an on-demand intelligent assistant that monitors communications of a user in regards to a target individual, and that selectively prefetches relevant information about the target individual.

In an example of an implementation, a user can be a service clerk interacting with a customer. An on-demand intelligent assistant residing on a computer of the user can automatically assist the interaction by passively detecting physical identifiers of the customer (e.g., face and/or voice) using sensors (e.g., a camera and/or a microphone) and determine baseline information about the customer. The baseline information can include identification information (e.g., customer name and customer number) and account information (e.g., account type and account number). Using the baseline information in combination with information obtained by monitoring the interaction between the clerk and the customer, the on-demand intelligent assistant can dynamically generate search queries to retrieve additional information of the customer (e.g., account details, documents, and forms) without the clerk or the customer actively providing any query parameters to the on-demand intelligent assistant, and automatically prefetch the additional information. In some implementations the on-demand intelligent assistant may offer to retrieve such information for the clerk and await authorization from the clerk before prefetching the additional information. For example, if the clerk and customer are discussing automobile insurance, the on-demand intelligent assistant may ask the user, "Would you like to view the customer's recent automobile insurance claims?" If the user accepts the offer, the on-demand intelligent assistant can retrieve the information from the information archives and temporarily store it on the user's computer.

On-demand intelligent assistants in accordance with the present disclosure, improve upon the existing technology of intelligent automated assistants in several respects. By automatically identifying target individuals and generating queries to retrieve information about the target individuals, an on-demand intelligent assistant may reduce errors associated with manual data entry. Moreover, by automatically prefetching information for users, the on-demand intelligent assistant increases the speed at which the information is provided, while reducing the workload of the user that might otherwise be involved in identifying and requesting such information. Additionally, by selectively determining and submitting queries using passively-determined baseline information of the target individual and the context of the user's conversation, the on-demand intelligent assistant reduces the processing power and communication bandwidth involved in retrieving such information.

While the above example is directed to customer service, implementations consistent with the present disclosure are not limited to such examples. It is understood that contexts can be provided in other implementations. For example, in some implementations, the user can be a commentator (e.g. a play-by-play sportscaster) of a sporting event, and an on-demand intelligent assistant can prefetch baseline information of a particular player appearing on a television camera. Based on spoken communication of the commentator, the on-demand intelligent assistant may offer to retrieve additional information about the player. For example, if the commentator mentions the player's playoff performance, the on-demand digital assistant could proactively offer, "would you like to retrieve the player's statistics from previous playoff games," and generate queries to retrieve such information from an archive of player statistics.

Reference will now be made in detail to specific implementations illustrated in the accompanying drawings and figures. In the following detailed description, numerous specific details are set forth to provide a thorough understanding of the invention. However, it will be apparent to one of ordinary skill in the art that implementations may be practiced without these specific details. In other instances, well-known methods, procedures, components, circuits, and networks have not been described in detail so as not to unnecessarily obscure aspects of the implementations.

Figure 1:
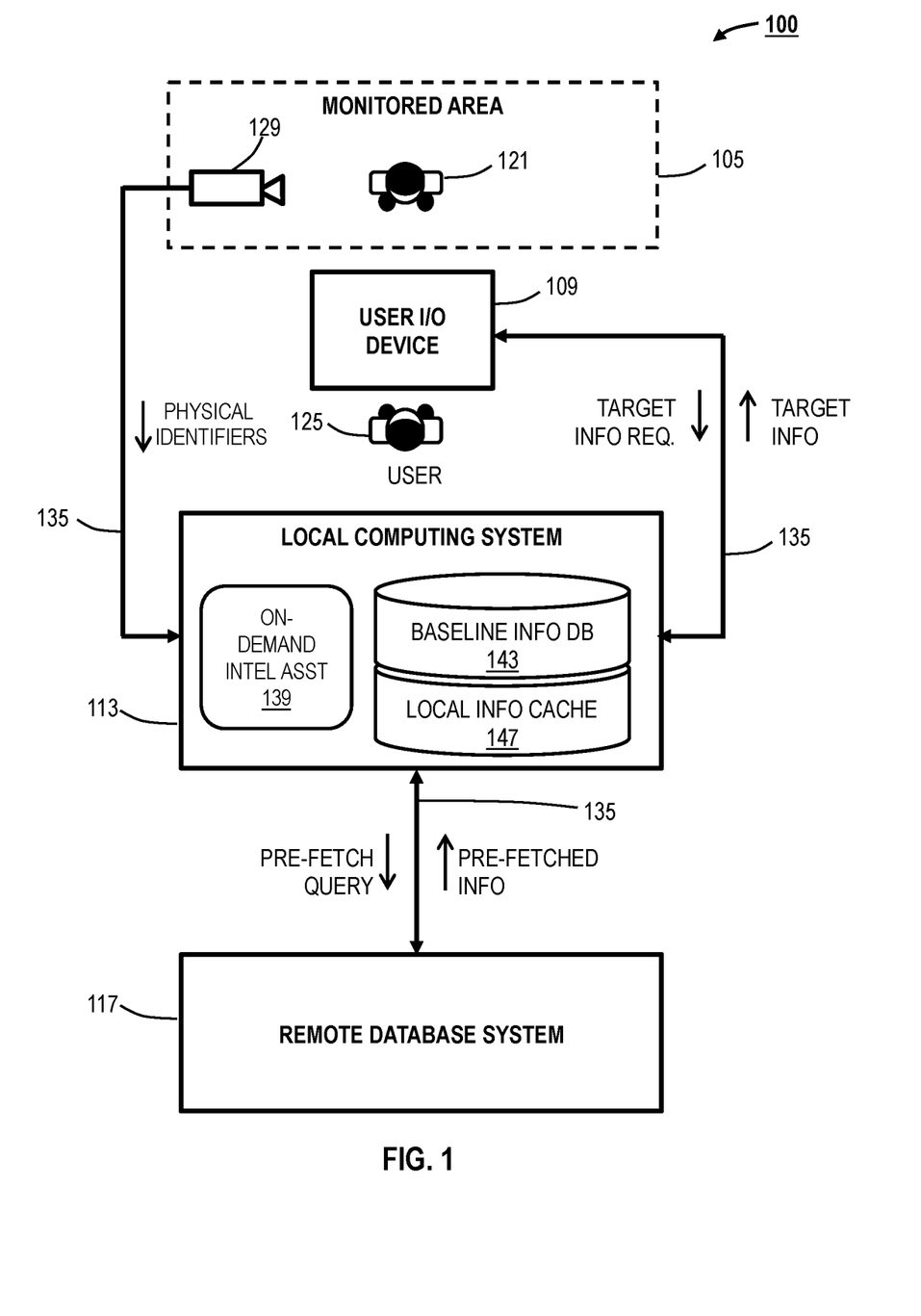
FIG. 1 shows a system block diagram illustrating an example of an environment for implementing systems and processes in accordance with aspects of the present disclosure.

FIG. 1 shows a block diagram illustrating an example of an environment 100 for implementing systems and processes in accordance with aspects of the present disclosure. The environment 100 can include a monitored area 105, a user input/output (I/O) device 109, a local computing system 113, a remote database system 117, a target individual 121, and a user 125. The monitored area 105 can be a physical region at which the target individual 121 currently resides and can be observed by one or more sensor systems 129. The sensor system 129 can include cameras and microphones that monitor area 105 to capture images and speech. In some implementations, the monitored area 105 can be a commercial space, such as an interior of a store, a financial institution, a service center, or the like. In some implementations, the monitored area 105 can be an entertainment venue, such as a stadium, an athletic field, a theater, or the like. In some implementations, the monitored area 105 can be a professional space, such as an office or medical examination room, or the like. Additionally, in online implementations, the monitored area 105 can be a current location of the target individual 121 (e.g., indoor or outdoor) that can be captured by a camera of the target individual's desktop computer, portable computing device, smartphone, or the like.

The user input/output (I/O) device 109 can include any device that enables the user 125 to interact with the local computing system 113. The user I/O device 109 may comprise, for example, a touchscreen display, pointer device, keyboard, etc. The local computing system 113 may comprise any general-purpose or special-purpose computing system, such as a personal computer or an application-specific processor. The local computing system 113 can be operatively and communicatively connected to the user I/O device 109, the remote database system 117, and the sensor system 129 by communication links 135. The communication links 135 may comprise wired and/or wireless mediums used to exchange information between various devices and computers. The communication links 135 may comprise part of one or more communication channels (e.g., serial, parallel, or wireless data links) and communication networks, (e.g., a local area network, a wide area network, or the Internet).

The local computing system 113 can include an on-demand intelligent assistant 139, a baseline information database 143, and a local information cache 147. The on-demand intelligent assistant 139 may comprise a software application that performs processes and functions, as detailed herein. For example, the on-demand intelligent assistant 139 may comprise one or more software modules that perform functions including, facial recognition, gesture recognition, voice recognition, language translation, text-to-speech conversion, natural language processing, and database query generation. The on-demand intelligent assistant 139 can interact with the user 125 through the use of logical rules and/or heuristic rules to determine and select questions regarding the retrieval of information in relation to the target individual 121. For example, the on-demand intelligent assistant 139 can use natural language processing (e.g., IBM WATSON™ by INTERNATIONAL BUSINESS MACHINES INC., of Armonk, N.Y., and natural language processing by OPENAI.COM) to interact with the user 125 (e.g., via text and/or speech).

The baseline information database 143 may comprise one or more data storage devices that store baseline information of individuals, including the target individual 121. For example, the baseline information database 143 may comprise a customer database including customer names and account information. In another example, the baseline information database 143 may comprise a player database including player names and jersey numbers. While FIG. 1 depicts the baseline information database 143 within the local computing system 113, it is understood that the baseline information database 143 can be maintained elsewhere. For example, in some implementations, the baseline information database 143 can be maintained at the remote database system 117. The local information cache 147 may comprise one or more data storage devices that store information of the target individual 121 that has been prefetched from the remote database system 117.

The remote database system 117 may comprise one or more information archives that stores records of individuals, such as target individual 121. The remote database system 117 can store records including preexisting information of the target individual 121. The records can include, for example, information of accounts, policies, transactions, documents, and forms of the target individual 121. In implementations, the remote database system 117 may comprise a back-end database that responds to queries from client computers, such as the local computing system (e.g. through SQL ("Structured Query Language") queries). For example, the remote database system 117 may comprise an enterprise database system.

Figure 2:
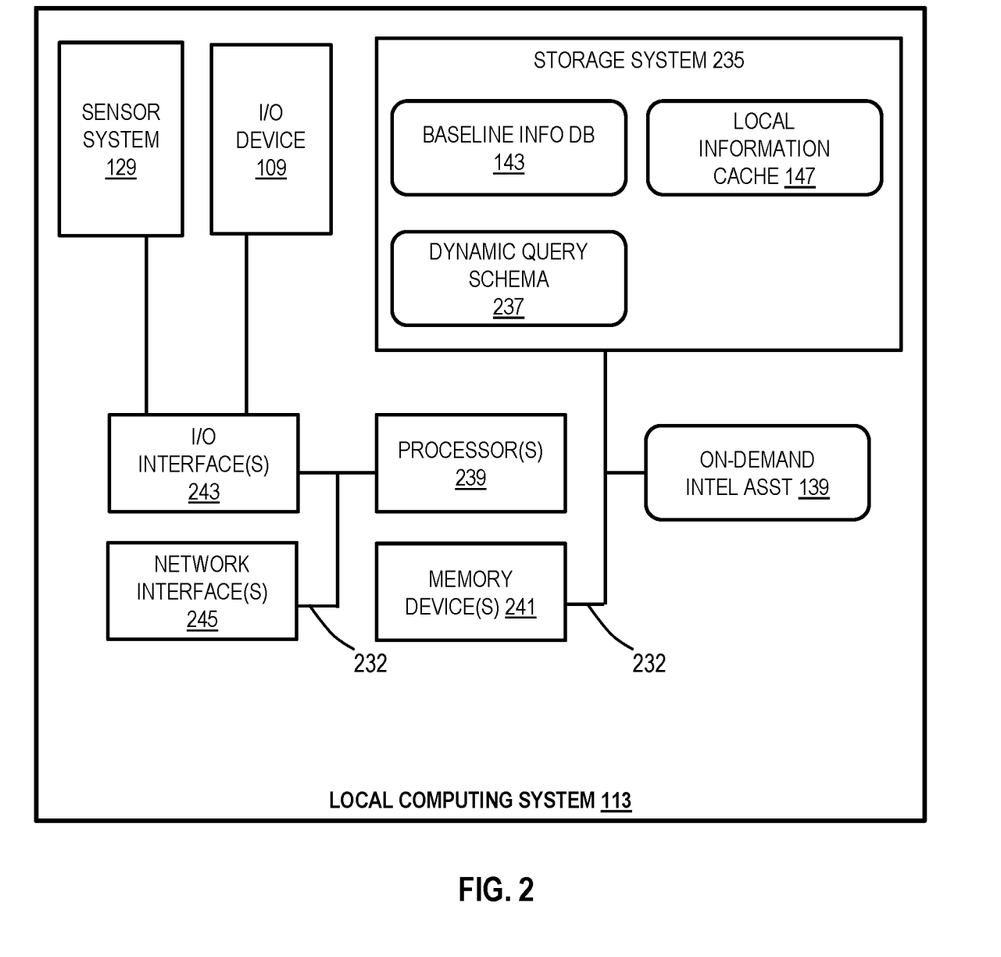
FIG. 2 shows a block diagram illustrating an example of a local computing system in accordance with aspects of the present disclosure.

FIG. 2 shows a system block diagram illustrating an example of a local computing system 113 providing an on-demand intelligent assistant 139, in accordance with aspects of the present disclosure. The local computing system 113 and the on-demand intelligent assistant 139 can be the same or similar to those described above. As depicted in FIG. 2, the local computing system 113 includes storage system 235, and an input/output (I/O) device 109, which can also be the same or similar to that previously described herein.

The storage system 235 may comprise a computer-readable, non-volatile hardware storage device that stores information and program instructions. For example, the storage system 235 may comprise one or more flash drives and/or hard disk drives. In accordance with aspects of the present disclosure, the storage system 235 can store baseline information database 143 and a local data cache 147, which can be the same or similar to that previously described herein. Additionally, the storage system 235 can store dynamic query schema 237 for dynamically generating search queries for information about a target (e.g., target individual 121).

In embodiments, the local computing system 113 includes one or more processors 239 (e.g., microprocessor, microchip, or application-specific integrated circuit), one or more memory devices 241 (e.g., RAM and ROM), one or more I/O interfaces 243, and one or more network interfaces 245. The memory device 241 can include a local memory (e.g., a random-access memory and a cache memory) employed during execution of program instructions. Additionally, the local computing system 113 can include one or more data communication channels 232 (e.g., a data bus) by which it communicates with the sensor system 129 and I/O devices 109 and the storage system 235. The processor 239 executes computer program instructions (e.g., an operating system and/or application programs), which can be stored in the memory device 241 and/or the storage system 235. The processor 239 can also execute computer program instructions of the on-demand intelligent assistant 139. It is noted that the local computing system 113 may comprise any general-purpose computing article of manufacture capable of executing computer program instructions installed thereon (e.g., a personal computer, a server, etc.). However, the local computing system 113 is only representative of various possible equivalent computing devices that can perform the processes described herein. To this extent, in implementations, the functionality provided by the local computing system 113 may comprise any combination of general and/or specific purpose hardware and/or computer program instructions. In each implementation, the program instructions and hardware can be created using standard programming and engineering techniques, respectively.

Figure 3:
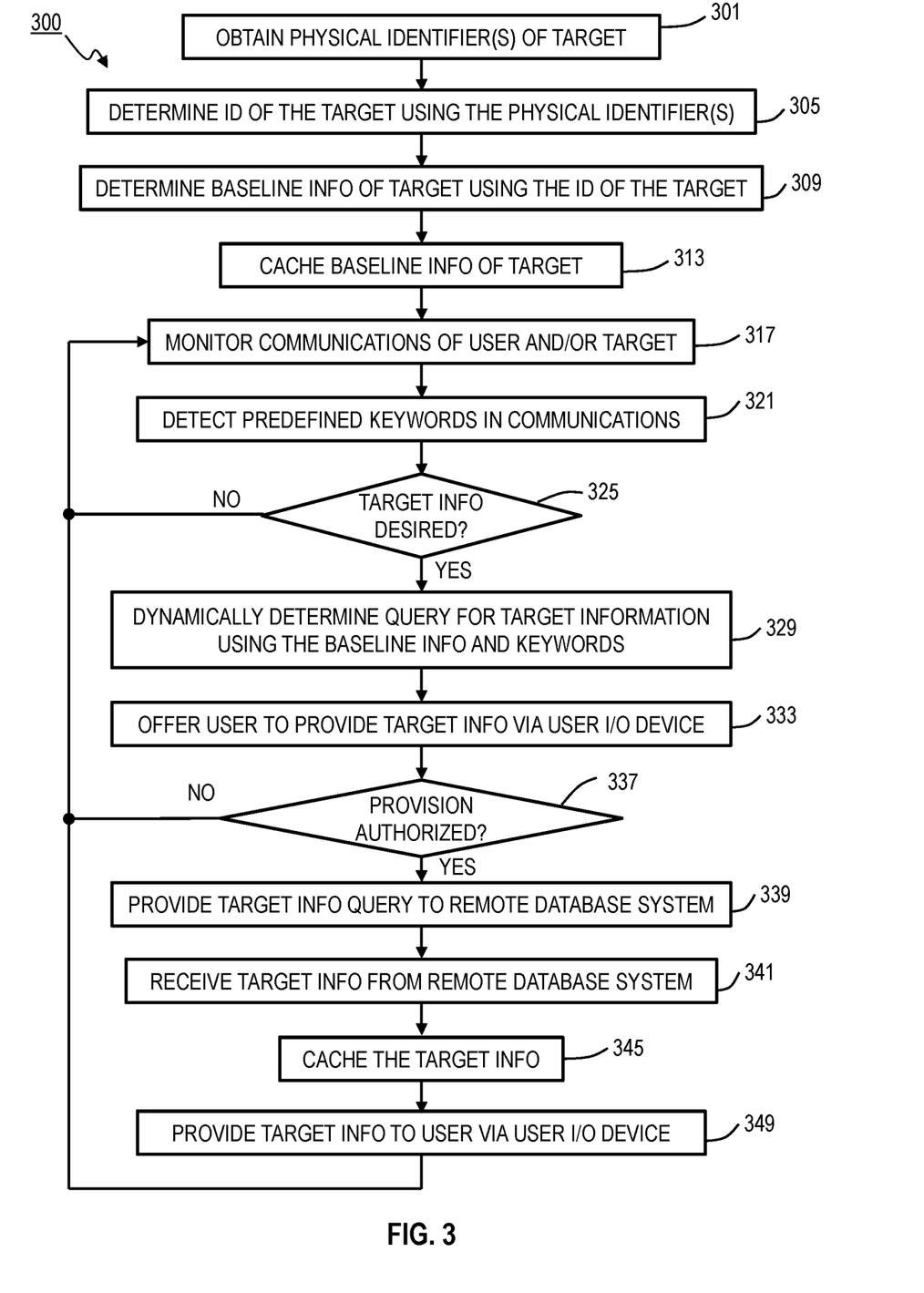
FIG. 3 shows a flow block diagram illustrating an example of a process in accordance with aspects of the present disclosure.

The flow diagram in FIG. 3 illustrates an example of the functionality and operation of possible implementations of systems, methods, and computer program products according to various implementations consistent with the present disclosure. Each block in the flow diagram of FIG. 3 can represent a module, segment, or portion of program instructions, which includes one or more computer executable instructions for implementing the illustrated functions and operations. In some alternative implementations, the functions and/or operations illustrated in a particular block of the flow diagram can occur out of the order shown in FIG. 3. For example, two blocks shown in succession can be executed substantially concurrently, or the blocks can sometimes be executed in the reverse order, depending upon the functionality involved. It will also be noted that each block of the flow diagram and combinations of blocks can be implemented by special purpose hardware-based systems that perform the specified functions or acts, or combinations of special purpose hardware and computer instructions.

FIG. 3 shows a flow block diagram illustrating an example of a process 300 for prefetching information of a target individual for a user by an on-demand intelligent assistant, in accordance with aspects of the present disclosure. At 301, the on-demand intelligent assistant (e.g., on-demand intelligent assistant 139) executed by a computing system (e.g., local computing system 113) of a user (e.g., user 125) can obtain physical identifiers of a target (e.g., target individual 121). In implementations, the physical identifiers can be captured passively. For example, using a camera and/or microphone (e.g., sensor system 129), the on-demand intelligent assistant can capture images of the target and/or words uttered by the target intentionally providing such information or without the target being aware that such information is being collected.

At 305, the on-demand intelligent assistant can determine an identity of the target using the physical identifiers obtained at 301. For example, the on-demand intelligent assistant can determine the identity of the target by performing facial recognition and/or voice recognition using techniques known in the art. In some implementations, the determination of the target's identity can be performed using information stored solely at the computing system. By doing so, information of the target may be maintained locally to prevent unauthorized or unintentional disclosure of personally-identifiable information. In some implementations, the on-demand intelligent assistant can include application program interfaces for third-party services that can determine the target's identity based on the physical identifiers.

At 309, the on-demand intelligent assistant can determine baseline information of the target using the target identity determined at 305. In implementations, the baseline information can be located and retrieved from a database of baseline information (e.g., baseline information database 143). At 313, the on-demand intelligent assistant can cache the baseline information determined at 309. For example, the baseline information can be stored in a local information cache (e.g., local information cache 147), which may temporarily store the baseline information during an interaction between the user and the target, and delete such information when the interaction is complete.

At 317, the on-demand intelligent assistant can monitor communications of the user and/or the target. The monitoring can be continuous or substantially continuous. For example, using the sensors, the on-demand intelligent assistant can use language translation, speech recognition and natural language processing techniques known in the art to interpret spoken words and phrases uttered by the user and the target. At 321, the on-demand intelligent assistant can detect predefined keywords in the communications monitored at 317. At 325, the on-demand intelligent assistant can determine whether the keywords detected at 321 indicate a desire for additional information of the target. For example, using a bag-of-words model, the on-demand intelligent assistant can use natural language processing to detect predetermined words or combinations of words and, based on the frequency and/or distance of such words, determine a running confidence score for predetermined types of information the user may desire. For example, the on-demand intelligent assistant may track combinations of words related to the following types or subtypes of information: automobile coverage, automobile payments, automobile claims, personal property coverage, personal property payments, personal property claims, and homeowner coverage, homeowner payments, and homeowner claims. When the confidence score for one of the types of information exceeds a predetermined threshold (e.g., 90%), the system can determine that the user desires to receive such information. If at 325 the on-demand intelligent assistant determines that the keywords detected at 321 do not constitute a potential desire for information of the user (i.e., 325 is "No"), then the process 300 can return to 317, and the on-demand intelligent assistant can continue monitoring communications. If at 325 the on-demand intelligent assistant determines that the keywords detected at 321 do constitute an information request (i.e., 325 is "Yes"), then at 329 the on-demand intelligent assistant can determine a query for the type of information about the target using the baseline information determined at 305 and 309, and the keywords detected at 321.

At 329, the on-demand intelligent assistant can dynamically determine a search query for the information of the target determined at 325 using the baseline information determined at 305 and 309, and the keywords detected at 321 in relation to the determined information of the target. For example, the information of the target determined can be "automobile payments," the baseline information can include a target's name, customer number, account types and account numbers, such as Jane Doe; ID No. 4253425, automobile account, automobile account no. 10-454523-34, personal property account, property account no. 10-345362-54. The keywords associated with the determined information can be "auto policy," "overdue," and "unpaid," which have been passively obtained by monitoring the communications of the user and/or the target, rather than being intentionally provided to the system for the purpose of being query parameters. The on-demand intelligent assistant can combine the baseline information and keywords related to automobile policies into a query using a predefined schema associated with the information of the target. For example, a schema for a dynamic query associated with [Automobile Policy Payments] may include [name] [customer number] [automobile account] [automobile account no.] [payments].

At 333, the on-demand intelligent assistant can make an offer to the user to provide information of the target determined at 325 via the user interface (e.g., user I/O device 109). In accordance with aspects of the present disclosure, the on-demand intelligent assistant can proactively initiate the offer of the information without the user or the target intentionally or actively prompting the on-demand intelligent assistant to do so.

At 337, the on-demand intelligent assistant determines whether the user authorized the provision of the target information. If at 337, the on-demand intelligent assistant determines that the user did not authorize retrieval of the target data (i.e., 337 is "No"), then the process 300 can return to 317 and the on-demand intelligent assistant can continue monitoring communications. For example, a determination that the user did not authorize retrieval of the target data results when the user rejects the offer made at 333 via the user I/O device, or if no response to the offer made at 333 is received from the user I/O device within a predetermined amount of time. If at 337, the on-demand intelligent assistant can determine that the user did authorize retrieval of the target data (i.e., 337 is "Yes"), then at 339 the on-demand intelligent assistant can provide the query determined at 329 to one or more remote database systems storing the target information.

At 341, the on-demand intelligent assistant can receive the target information from the remote database in response to the query provided at 339. At 345, the on-demand intelligent assistant can cache the target information received at 341. For example, the target information can be temporarily stored in the local information cache (e.g., local information cache 147). At 349, the on-demand intelligent assistant can provide the target information received at 341 to the user via the user I/O device and the process 300 can return to 317 and the on-demand intelligent assistant can continue monitoring communications.

Figure 4:
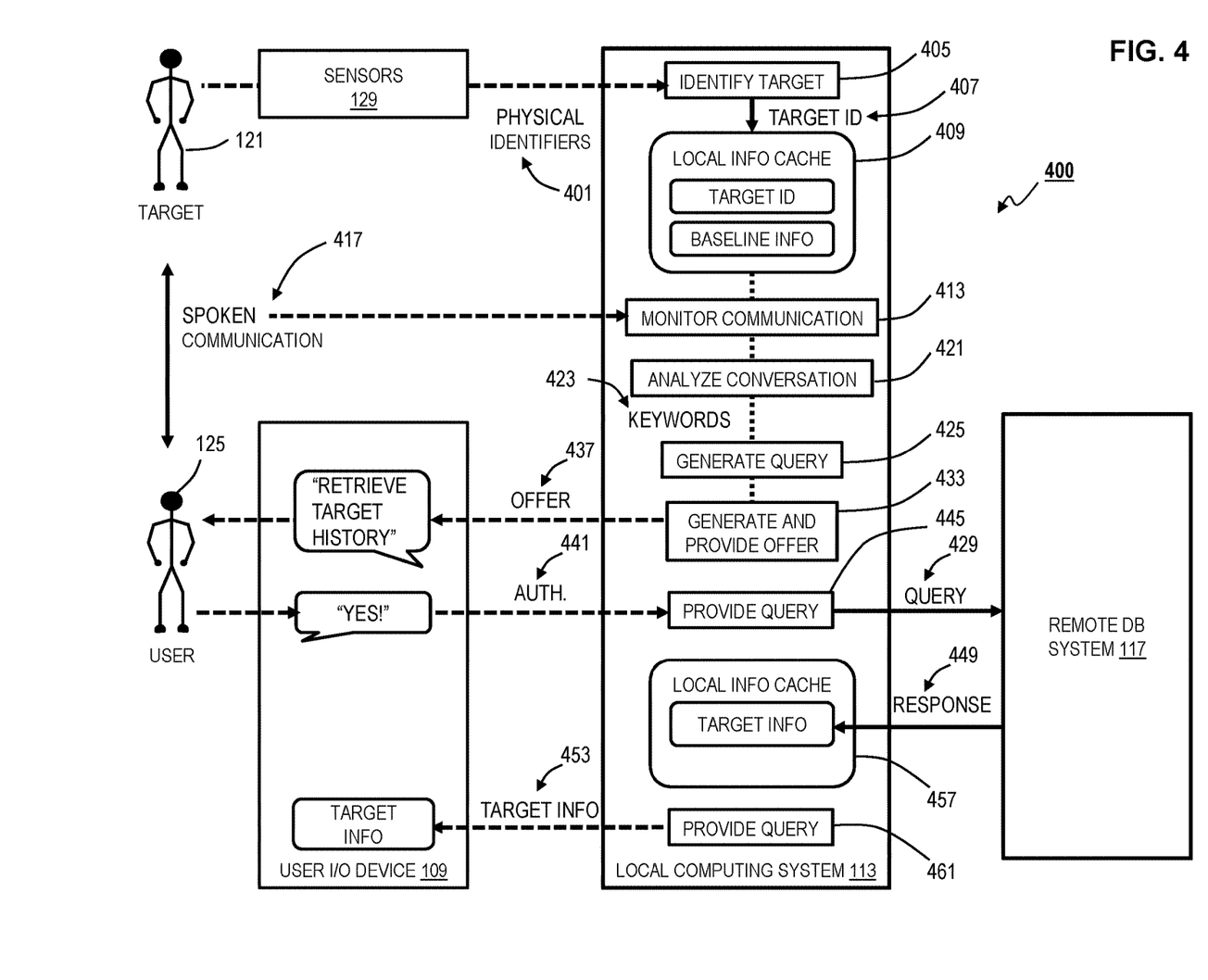
FIG. 4 shows a functional block diagram illustrating an example of a process in accordance with aspects of the present disclosure.

FIG. 4 shows a functional flow diagram illustrating an example of a process 400 in accordance with aspects of the present disclosure. The process 400 involves a user input/output (I/O) device 109, a local computing system 113, a remote database system 117, a target individual 121, a user 125, and sensors 129, all of which can be the same or similar to those previously described herein. As depicted in FIG. 4, the local computing system 113, executing the on-demand digital assistant, can obtain physical identifiers 401 (images and speech) of the target 121 passively captured by the sensors 129. At 405, the local computing system 113 can use the physical identifiers 401 to determine an identity 407 of the target individual 121 and, at 409, store the target's identity 407 in a local information cache (e.g., local information cache 147). Additionally, at 413, the local computing system 113 can monitor spoken communication 417 of the target 121 and the user 125.

At 421, the local computing system 113 can determine keywords 423 in the conversation using, e.g., speech recognition and natural language processing. At 425, the local computing system 113 can automatically generate a query 429 for information of the target 121 that the user 125 may desire based on the analysis of the keywords 423 at 421. At 433, the local computing system 113 can generate an offer 437 based on the analysis of the keywords 423 at 42 land can provide the offer 437 to retrieve the information of the target 121 to the user 125 via the user I/O device 109.

In response to receiving an authorization 441 from the user 125, at 445 the local computing system 113 can provide the query 429 to the remote database system 117. The local computing system 113 can receive a response 449 including target information 453 from the remote database system 117 in response to the query at 445, and at 457, can store the target information in a local information cache (e.g., local information cache 147), which may be stored locally at the local computing system 113. At 461, the local computing system 113 can provide the target information 453 to the user 125 via the user I/O device 109.

While the functional flow diagram shown in FIG. 4 illustrates functions and operations of the local computing system 113 as occurring in a particular order, the functions and/or operations illustrated can occur out of the order shown in FIG. 4 depending upon the functionality involved. For example, in some implementations of the example shown in FIG. 4, the local computing system 113 can, at 425, generate the query 429 and, at 457, store the received response 449 to the query 429, before providing the offer 437 at 433. Also, in some implementations, some functions and/or operations can be skipped. For example, in some implementations of the example depicted in FIG. 4, the functions of providing the offer at 433 and receiving authorization 441 can be skipped.

Figure 5:
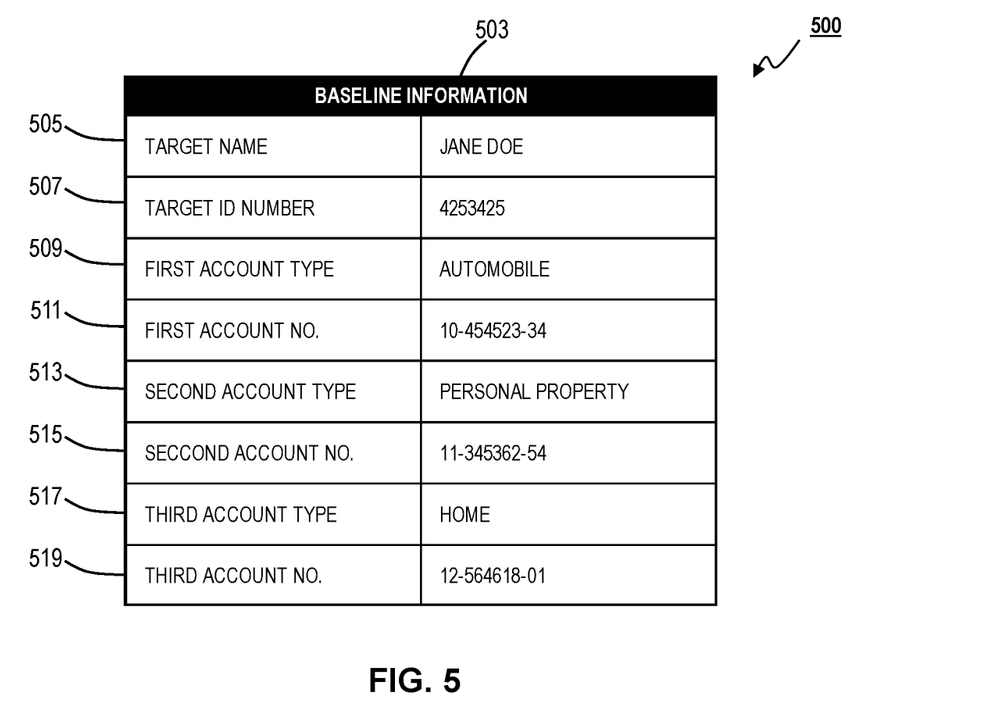
FIG. 5 shows a table illustrating an example of a data structure containing baseline information in accordance with aspects of the present disclosure.
Figure 6:
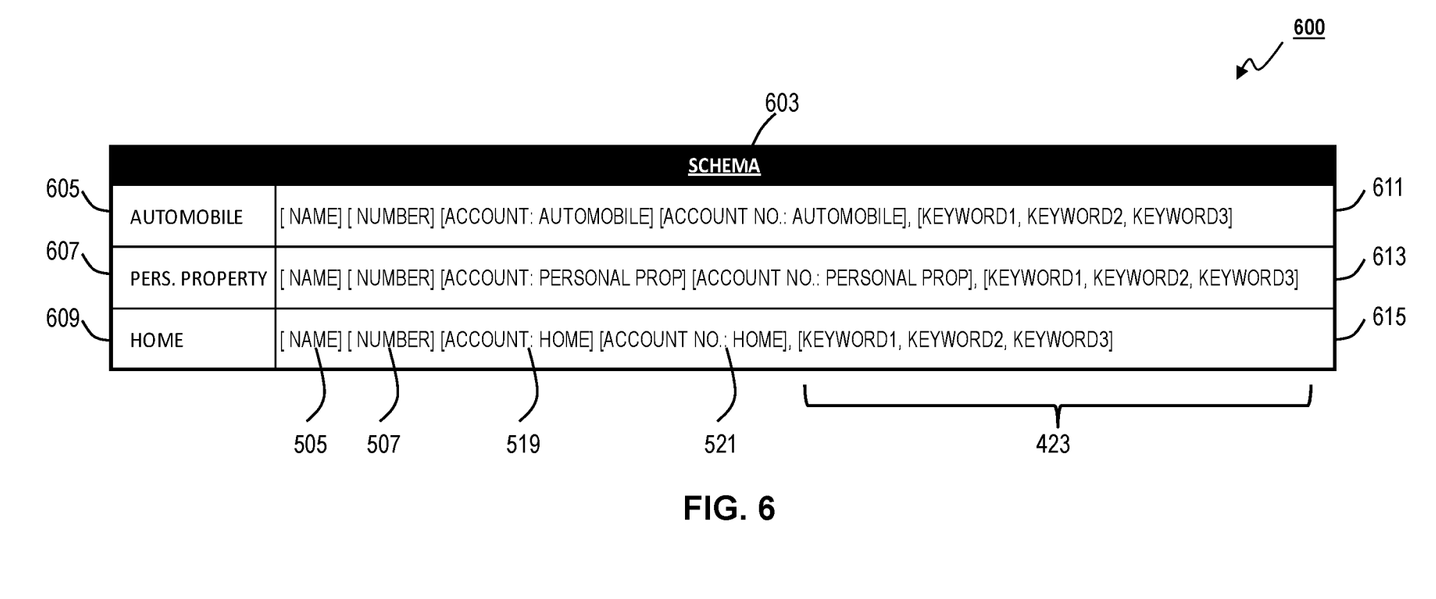
FIG. 6 shows a table illustrating an example of a data structure containing information for dynamically generating queries in accordance with aspects of the present disclosure.

FIG. 5 shows a table 500 illustrating an example of a data structure containing baseline information 503 in accordance with aspects of the present disclosure. FIG. 6 shows a table illustrating 600 an example of a data structure containing schema 603 for dynamically generating queries in accordance with aspects of the present disclosure. The tables 500 and 600 can be stored in a storage device (e.g., in storage system 235 as dynamic query schema 237). The baseline information 503 stored in table 500 can be the same or similar to that described previously herein. For example, the baseline information 503 can include, for example, a target name 505, a target identification number 507, a first account type 509, a first account number 511, a second account type 513, a second account number 515, a third account type 517, and a third account number 519. One or more elements of the baseline information can be used to reference additional, related information in a database (e.g., remote database system 117).

The schema 603 stored in the table 600 can associate a number of information types 605, 607, 609 with respective search queries 611, 613, and 615. The information types 605, 607, 609 can correspond to predetermined types of information identified based on keywords spoken during a conversation between a user and a target individual. As previously described herein, the information types 605, 607, 609 may be selected based on a running confidence score for each information type during such conversation. The search queries 611, 613, and 615 can include predefined combinations of information tailored to each of information types 605, 607, 609. The predefined information can be comprised of a subset of the baseline information 503 and keywords corresponding to the predetermined types. For example, the search topic 609 ("Home") can correspond to search query 615, which can include baseline information 503, including target name 505 (e.g., "Jane Doe"), target identification number 507 (e.g., "4253425"), third account type 517 (e.g., "Home") and third account number (e.g., "12-564618-01"). Additionally, the search query 615 can include a set of keywords 423 (e.g., "house," "policy," and "payment")

obtained from the conversation and associated with the predetermined type, as previously described herein.

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is also to be understood that the terminology used herein is for the purpose of describing examples of implementations, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." In addition, where features or aspects of the disclosure are described in terms of Markush groups, those skilled in the art will recognize that the disclosure is also thereby described in terms of any individual member or subgroup of members of the Markush group.

What we claim is:

1. An on-demand intelligent data retrieval system, the system comprising:
   one or more sensors;
   an input/output interface device;
   a processor; and
   one or more computer-readable data storage devices storing program instructions that when executed by the processor, control the on-demand intelligent data retrieval system to perform operations comprising:
      obtaining one or more physical identifiers of a target individual using information received from the one or more sensors;
      determining an identity of the target individual using the one or more physical identifiers;
      caching the one or more physical identifiers of the target individual and the identity of the target individual in the one or more computer-readable data storage devices as baseline information of the target individual;
      detecting keywords used in communications of a user with the target individual using speech recognition;
      determining that the user desires additional information of the target individual based on the keywords;
      determining, based on one or more of a frequency and a distance of the keywords, a confidence score that the additional information desired by the user corresponds to a predetermined type of information;
      determining a query for the additional information of the target individual when the confidence score equals or exceeds a predetermined threshold, using the baseline information of the target individual and the keywords;
      retrieving the additional information of the target individual from a remote database system using the query; and
      providing, using the input/output interface device, the additional information of the target individual to the user.

2. The system of claim 1, wherein detecting the keywords used in communications of the user with the target individual comprises passively capturing the communications using the one or more sensors.

3. The system of claim 2, wherein determining the query for the additional information of the target individual comprises generating the query by passively obtaining parameters for the query from the user or the target individual.

4. The system of claim 3, wherein retrieving the additional information of the target individual comprises automatically providing the query to the remote database system.

5. The system of claim 1, wherein determining that the user desires additional information of the target individual comprises analyzing the keywords using natural language processing.

6. The system of claim 1, wherein the one or more physical identifiers comprise images or speech obtained from the target individual.

7. The system of claim 6, wherein obtaining the one or more physical identifiers comprises passively obtaining the images or the speech of the target individual.

8. The system of claim 1, wherein determining the identity of the target individual comprises determining the identity of the target individual using facial recognition or speech recognition.

9. The system of claim 1, wherein the operations further comprise obtaining user authorization to provide the additional information of the target individual.

10. The system of claim 9, wherein obtaining the user authorization occurs after retrieving the additional information of the target individual from a remote database system.

11. The system of claim 1, wherein:
the one or more sensors comprise a camera and a microphone;
the physical identifiers comprise image data obtained using the camera;
the keywords comprise speech data obtained using the microphone; and
the identity of the target individual comprises an alphanumeric code corresponding to information of the customer stored in the remote database system.

12. A method for operating an intelligent assistant, the method comprising:
obtaining one or more physical identifiers of a target individual using information received from one or more sensors;
determining an identity of the target individual using the one or more physical identifiers;
caching the one or more physical identifiers of the target individual and the identity of the target individual as baseline information of the target individual;
detecting, using the one or more sensors and speech recognition, keywords used in communications of a user with the target individual;
determining that the user desires additional information of the target individual based on the keywords;
determining, based on one or more of a frequency and a distance of the keywords, a confidence score that the additional information desired by the user corresponds to a predetermined type of information;
determining, when the confidence score equals or exceeds a predetermined threshold value, a query for the additional information of the target individual using the baseline information and the keywords;
retrieving the additional information of the target individual from a remote database system using the query; and
providing, using the input/output interface device, the additional information of the target individual to the user.

13. The method of claim 12, wherein detecting the keywords used in communications of the user with the target individual comprises passively capturing the communications using the one or more sensors.

14. The method of claim 13, wherein determining the query for the additional information of the target individual comprises generating the query by passively obtaining parameters for the query from the user or the target individual.

15. The method of claim 14, wherein retrieving the additional information of the target individual comprises automatically providing the query to the remote database system.

16. The method of claim 12, wherein determining that the user desires additional information of the target individual comprises analyzing the keywords using natural language processing.

17. The method stem of claim 12, wherein the one or more physical identifiers comprise images or speech obtained from the target individual.

18. The method of claim 17, wherein obtaining the one or more physical identifiers comprises passively obtaining the images or the speech of the target individual.

19. The method of claim 12, wherein determining the identity of the target individual comprises determining the identity of the target individual using facial recognition or speech recognition.

20. The method of claim 12, wherein:
the one or more sensors comprise a camera and a microphone;
the identity of the target individual comprises an alphanumeric code corresponding to information of the customer stored in the remote database system;
obtaining the one or more physical identifiers of the target individual comprises obtaining images of the target individual using the camera; and
detecting the keywords comprises obtaining speech of the user using the microphone.

* * * * *

UNITED STATES PATENT AND TRADEMARK OFFICE
CERTIFICATE OF CORRECTION

PATENT NO. : 11,113,595 B2  
APPLICATION NO. : 15/984682  
DATED : September 7, 2021  
INVENTOR(S) : Eric Palumberi et al.

Page 1 of 1

It is certified that error appears in the above-identified patent and that said Letters Patent is hereby corrected as shown below:

On the Title Page

Item (73), "THE TRAVELERS INDEMNIFY COMPANY" should read -- THE TRAVELERS INDEMNITY COMPANY --.

Signed and Sealed this  
Twenty-first Day of December, 2021

Drew Hirshfeld  
*Performing the Functions and Duties of the*  
*Under Secretary of Commerce for Intellectual Property and*  
*Director of the United States Patent and Trademark Office*